US012659377B2

(12) United States Patent
Barbounis et al.

(10) Patent No.: US 12,659,377 B2
(45) Date of Patent: Jun. 16, 2026

(54) REAL-TIME ACCESS TO REMOTE MEDIA PRODUCTION EDITING FUNCTIONALITY

(71) Applicant: CenturyLink Intellectual Property LLC, Denver, CO (US)

(72) Inventors: Sotiri Terry Barbounis, Tucson, AZ (US); Scott Brindamour, Scituate, MA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 42 days.

(21) Appl. No.: 18/829,958

(22) Filed: Sep. 10, 2024

(65) Prior Publication Data

US 2025/0126171 A1    Apr. 17, 2025

Related U.S. Application Data

(60) Provisional application No. 63/606,138, filed on Dec. 5, 2023, provisional application No. 63/590,553, filed on Oct. 16, 2023.

(51) Int. Cl.
H04L 67/06 (2022.01)
H04L 67/1097 (2022.01)
(Continued)

(52) U.S. Cl.
CPC ............ H04L 67/141 (2013.01); H04L 67/06 (2013.01); H04L 67/1097 (2013.01); G11B 27/031 (2013.01)

(58) Field of Classification Search
CPC ... H04L 61/141; H04L 61/06; H04L 61/1097; H04L 67/141; H04L 67/06; H04L 67/1097; G11B 27/031
(Continued)

(56) References Cited

U.S. PATENT DOCUMENTS

2010/0260468 A1* 10/2010 Khatib ............... H04N 21/2662
                                                    386/282
2011/0246554 A1* 10/2011 Bury .................... G11B 27/034
                                                    715/723
(Continued)

FOREIGN PATENT DOCUMENTS

CN          106993020 A     7/2017

OTHER PUBLICATIONS

International Search Report and Written Opinion of the International Searching Authority, dated Nov. 28, 2024, Int'l Appl. No. PCT/US2024/045973, Int'l Filing Date Sep. 10, 2024; 11 pgs.

*Primary Examiner* — Ario Etienne
*Assistant Examiner* — Kidest Mendaye

(57) ABSTRACT

Novel tools and techniques are provided for implementing real-time access to remote media production editing functionality. In various embodiments, in response to a request for real-time access to remote media production editing functionalities, a computing system provisions access to a media production software application ("app") on at least one of compute resources on at least one network edge node among a plurality of network edge nodes. The computing system establish an access connection between the at least one network edge node and a remote media storage system, via remote direct memory access ("RDMA") functionality. The computing system provides access to at least one media production file that is stored on the remote media storage system via the established access connection, for editing using the instantiated media production app. User input for the instantiated media production app and data, content, and/or editing results may be relayed over the established access connection.

18 Claims, 8 Drawing Sheets

(51) Int. Cl.
$\phantom{(51)}$ *H04L 67/141* $\qquad$ (2022.01)
$\phantom{(51)}$ *G11B 27/031* $\qquad$ (2006.01)

(58) Field of Classification Search
$\phantom{(58)}$ USPC ......................................................... 709/212
$\phantom{(58)}$ See application file for complete search history.

(56) References Cited

U.S. PATENT DOCUMENTS

| | | | |
|---|---|---|---|
| 2019/0114194 A1* | 4/2019 | Jani ........................ | G06F 3/0673 |
| 2020/0396357 A1* | 12/2020 | Wu ......................... | H04N 23/90 |
| 2022/0052922 A1* | 2/2022 | Meyer ................... | G06F 16/252 |

* cited by examiner

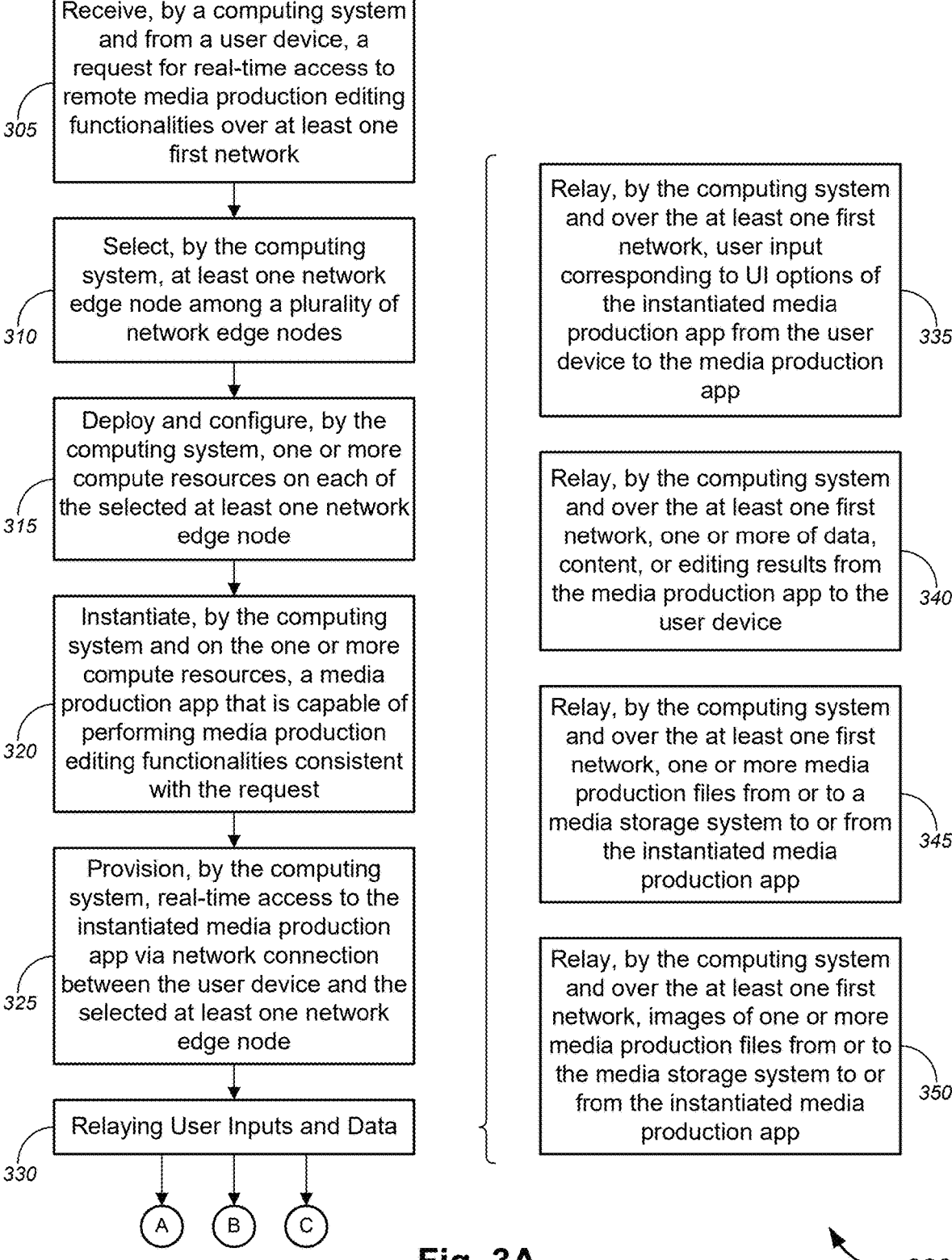

305 — Receive, by a computing system and from a user device, a request for real-time access to remote media production editing functionalities over at least one first network 310 — Select, by the computing system, at least one network edge node among a plurality of network edge nodes 315 — Deploy and configure, by the computing system, one or more compute resources on each of the selected at least one network edge node 320 — Instantiate, by the computing system and on the one or more compute resources, a media production app that is capable of performing media production editing functionalities consistent with the request 325 — Provision, by the computing system, real-time access to the instantiated media production app via network connection between the user device and the selected at least one network edge node 330 — Relaying User Inputs and Data

A    B    C

335 — Relay, by the computing system and over the at least one first network, user input corresponding to UI options of the instantiated media production app from the user device to the media production app 340 — Relay, by the computing system and over the at least one first network, one or more of data, content, or editing results from the media production app to the user device 345 — Relay, by the computing system and over the at least one first network, one or more media production files from or to a media storage system to or from the instantiated media production app 350 — Relay, by the computing system and over the at least one first network, images of one or more media production files from or to the media storage system to or from the instantiated media production app

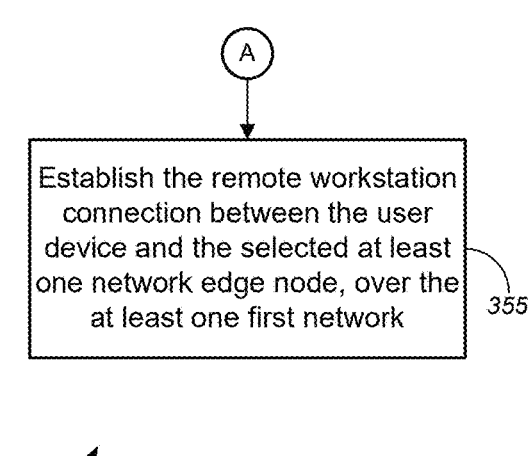

Establish the remote workstation connection between the user device and the selected at least one network edge node, over the at least one first network

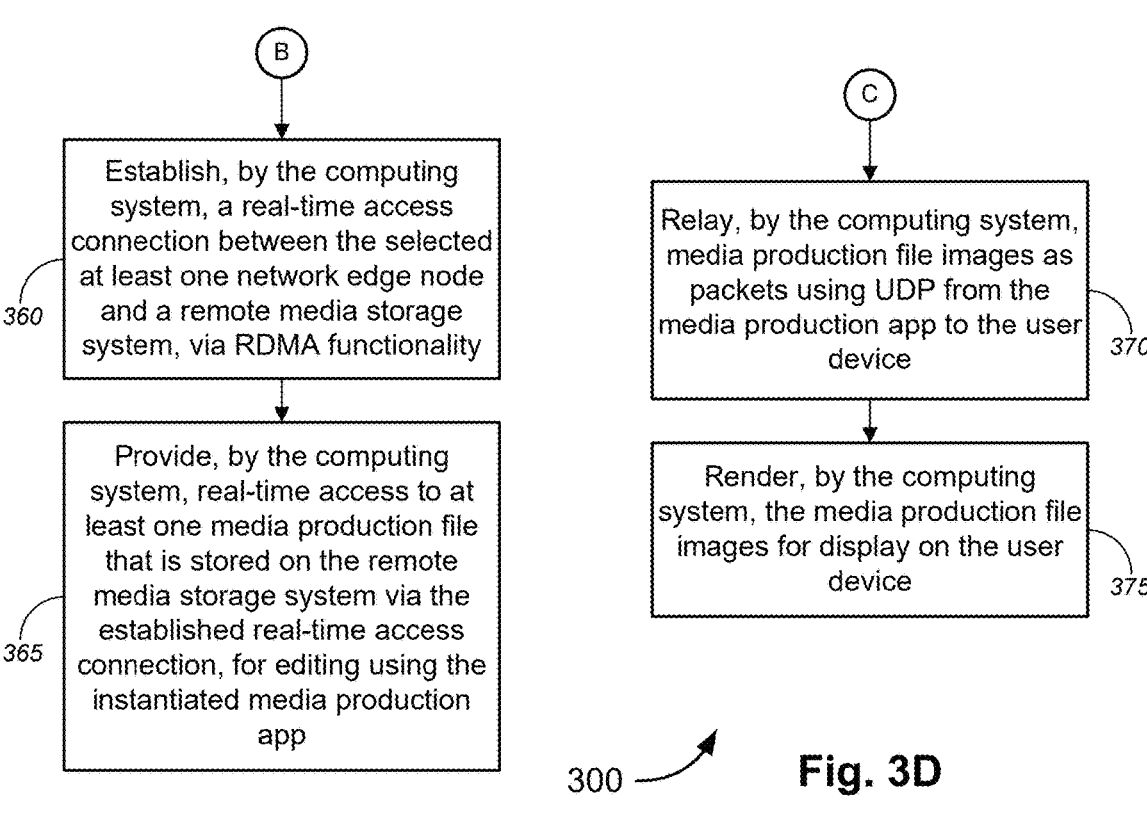

Establish, by the computing system, a real-time access connection between the selected at least one network edge node and a remote media storage system, via RDMA functionality

*360*

Provide, by the computing system, real-time access to at least one media production file that is stored on the remote media storage system via the established real-time access connection, for editing using the instantiated media production app

*365*

Relay, by the computing system, media production file images as packets using UDP from the media production app to the user device

*370*

Render, by the computing system, the media production file images for display on the user device

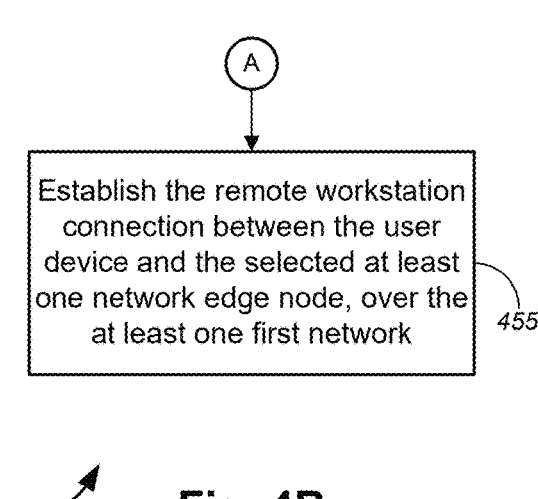

Establish the remote workstation connection between the user device and the selected at least one network edge node, over the at least one first network

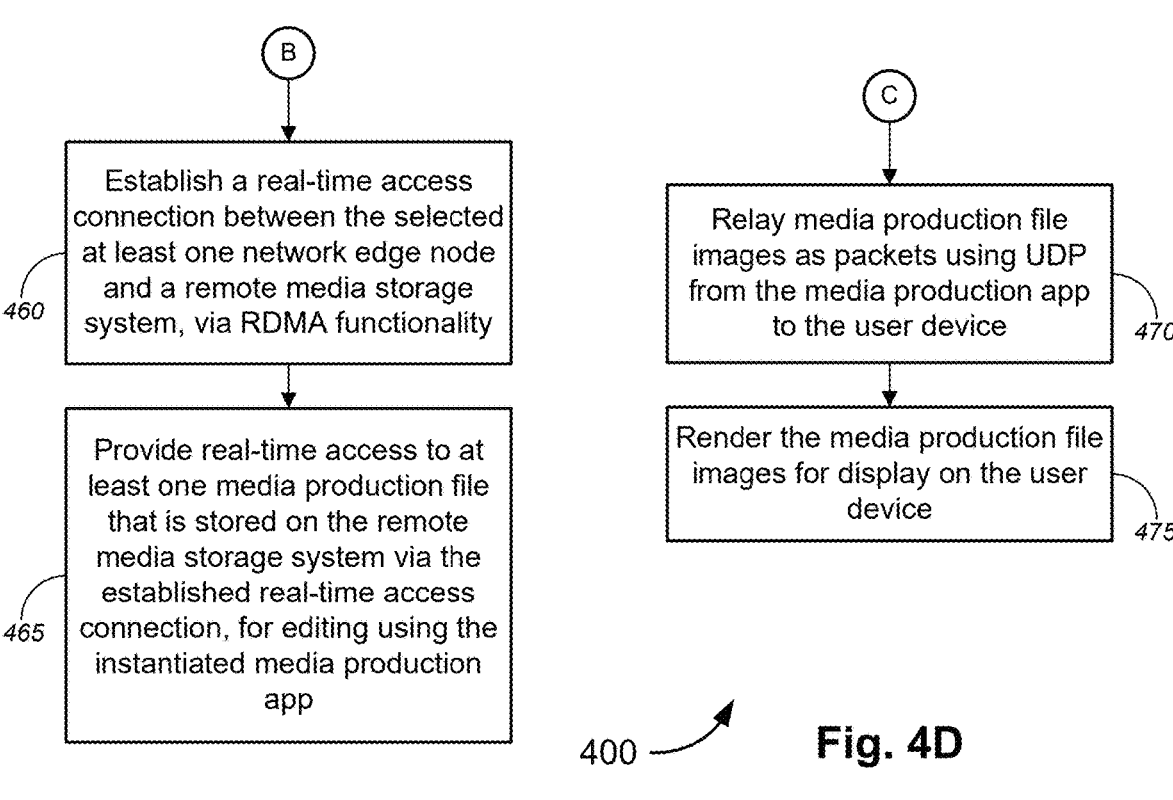

Establish a real-time access connection between the selected at least one network edge node and a remote media storage system, via RDMA functionality

460

Provide real-time access to at least one media production file that is stored on the remote media storage system via the established real-time access connection, for editing using the instantiated media production app

465

Relay media production file images as packets using UDP from the media production app to the user device

470

Render the media production file images for display on the user device

Figure 5:
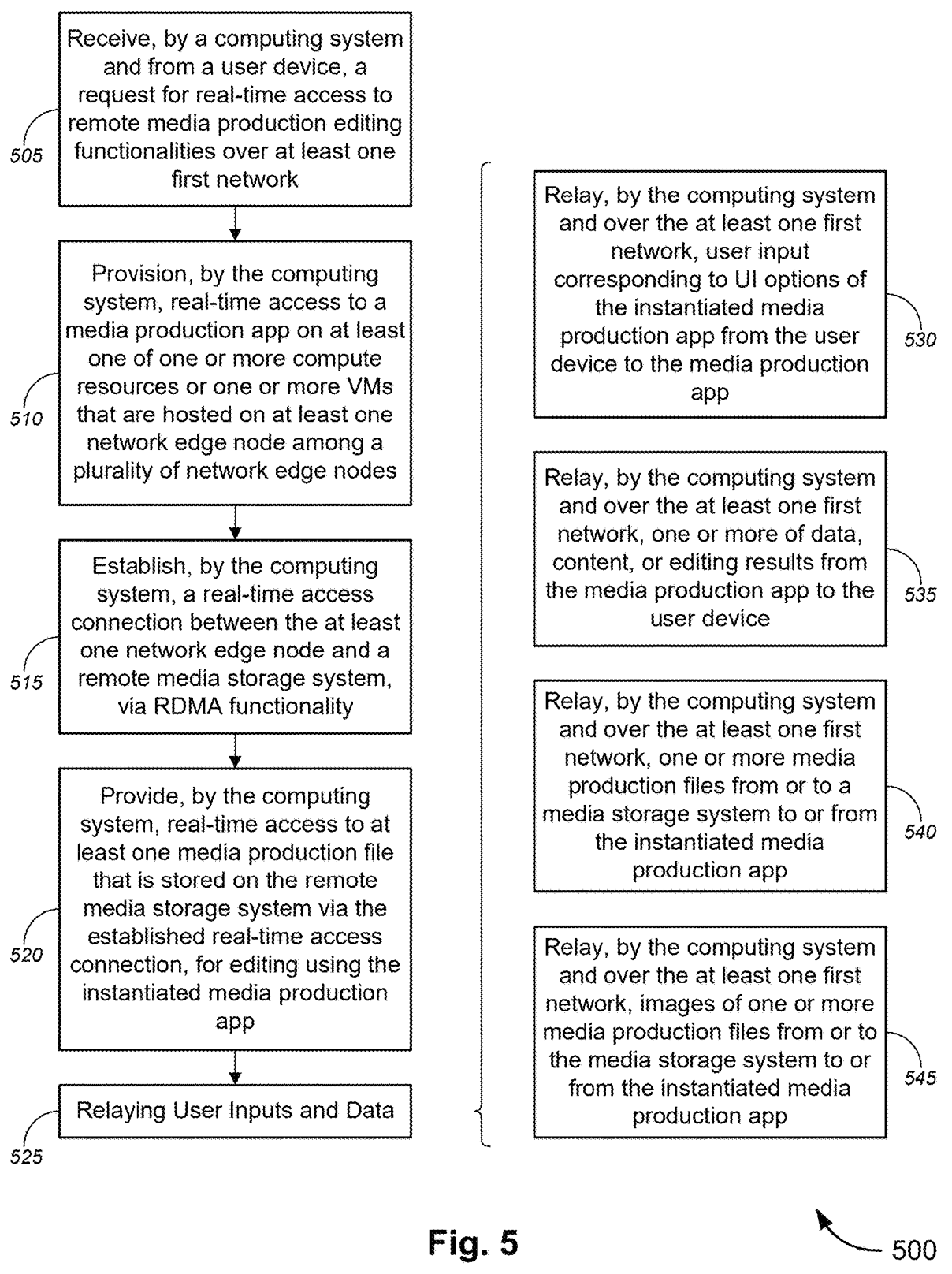

Receive, by a computing system and from a user device, a request for real-time access to remote media production editing functionalities over at least one first network

505

Provision, by the computing system, real-time access to a media production app on at least one of one or more compute resources or one or more VMs that are hosted on at least one network edge node among a plurality of network edge nodes

510

Establish, by the computing system, a real-time access connection between the at least one network edge node and a remote media storage system, via RDMA functionality

515

Provide, by the computing system, real-time access to at least one media production file that is stored on the remote media storage system via the established real-time access connection, for editing using the instantiated media production app

520

Relaying User Inputs and Data

525

Relay, by the computing system and over the at least one first network, user input corresponding to UI options of the instantiated media production app from the user device to the media production app

530

Relay, by the computing system and over the at least one first network, one or more of data, content, or editing results from the media production app to the user device

535

Relay, by the computing system and over the at least one first network, one or more media production files from or to a media storage system to or from the instantiated media production app

540

Relay, by the computing system and over the at least one first network, images of one or more media production files from or to the media storage system to or from the instantiated media production app

REAL-TIME ACCESS TO REMOTE MEDIA PRODUCTION EDITING FUNCTIONALITY

CROSS-REFERENCES TO RELATED APPLICATIONS

This application claims priority to U.S. Patent Application Ser. No. 63/590,553 (the "'553 Application"), filed Oct. 16, 2023, by Terry Barbounis et al., entitled, "Real-Time Access to Remote Media Production Editing Functionality," and U.S. Patent Application Ser. No. 63/606,138 (the "'138 Application"), filed Dec. 5, 2023, by Terry Barbounis et al., entitled, "Real-Time Access to Remote Media Production Editing Functionality," the disclosure of each of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

FIELD

The present disclosure relates, in general, to methods, systems, and apparatuses for implementing edge network service provisioning, particularly, to methods, systems, and apparatuses for implementing real-time access to remote media production editing functionality, and, more particularly, to methods, systems, and apparatuses for implementing real-time access to remote video editing functionality.

BACKGROUND

Today, media production editing is typically performed on media application software executed on local machines. Although media application software may be executed remotely, due to extended geographical distances between remote compute resources and client devices over which the remote media production editing may be conducted, significant lag and latency may occur. It is with respect to this general technical environment to which aspects of the present disclosure are directed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

FIGS. 3A-3D depict flow diagrams illustrating an example method for implementing real-time access to remote media production editing functionality and/or remote video editing functionality, in accordance with various embodiments.

FIGS. 4A-4D depict flow diagrams illustrating another example method for implementing real-time access to remote media production editing functionality and/or remote video editing functionality, in accordance with various embodiments.

FIG. 5 depicts flow diagrams illustrating yet another example method for implementing real-time access to remote media production editing functionality and/or remote video editing functionality, in accordance with various embodiments.

DETAILED DESCRIPTION OF CERTAIN EMBODIMENTS

Overview

Figure 1:
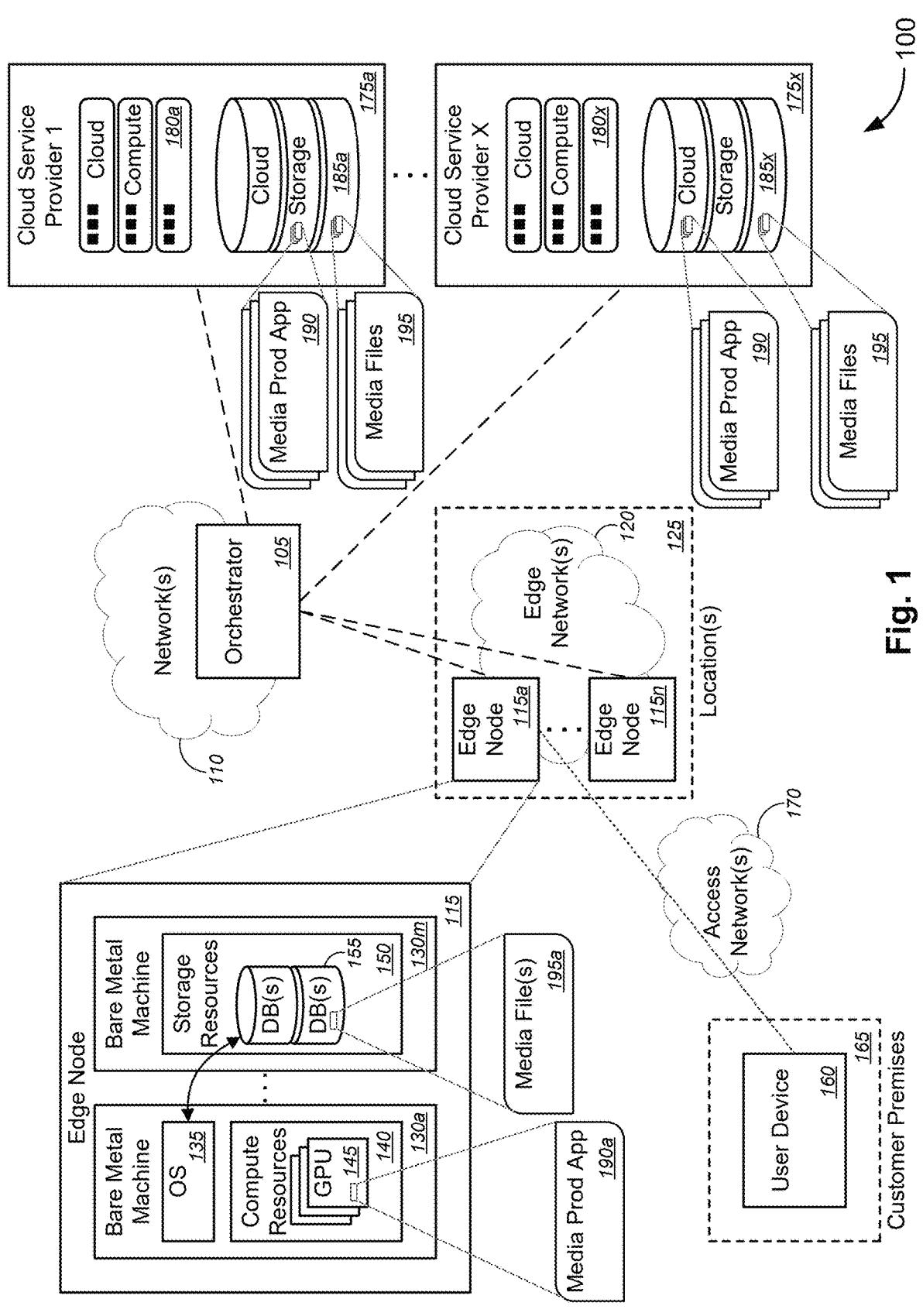
FIG. 1 depicts an example system for implementing real-time access to remote media production editing functionality and/or remote video editing functionality, in accordance with various embodiments.

Various embodiments provide tools and techniques for implementing edge network service provisioning, particularly, to methods, systems, and apparatuses for implementing real-time access to remote media production editing functionality, and, more particularly, to methods, systems, and apparatuses for implementing real-time access to remote video editing functionality.

In various embodiments, a computing system receives, from a user device, a request for real-time access to remote media production editing functionalities over at least one first network. The computing system provisions real-time access to a media production software application ("app") on at least one of one or more compute resources or one or more virtual machines ("VMs") that are hosted on at least one network edge node among a plurality of network edge nodes. The computing system may establish a real-time access connection between the at least one network edge node and a remote media storage system, via remote direct memory access ("RDMA") functionality. The computing system may provide real-time access to at least one media production file that is stored on the remote media storage system via the established real-time access connection, for editing using the instantiated media production app. The computing system may perform at least one of: relaying, over the at least one first network, user input corresponding to user interface ("UI") options of the instantiated media production app from the user device to the media production app; or relaying, over the at least one first network, one or more of data, content, or editing results from the media production app to the user device; and/or the like.

Challenges with media production may arise with respect to real-time collaboration due to significant latency and synchronization issues for geographically dispersed teams, with respect to high-resolution content processing due to resource-intensive processing and limited bandwidth for remote editors, and with respect to live streaming and post-production due to delays and performance issues and high latency requirements. Further challenges may also arise with respect to data security and privacy due to issues with protecting sensitive and proprietary content in cloud-based environments, and with respect to scalability and resource optimization due to issues with scaling and effectively allocating resources in complex media production projects. The various embodiments address these challenges, as described in detail below with respect to the figures.

These and other aspects of the real-time access to remote media production editing functionality and/or remote video editing functionality are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. In some cases, for denoting a plurality of components, the suffixes "a" through "n" may be used, where n denotes any suitable non-negative integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05a-X05n the integer value of n in X05n may be the same or different from the integer value of n in X10n for component #2 X10a-X10n and so on. In other cases, other suffixes (e.g., s, t, u, v, w, x, y, and/or z) may similarly denote non-negative integer numbers that (together with n or other like suffixes) may be either all the same as each other, all different from each other, or some combination of same and different (e.g., one set of two or more having the same values with the others having different values, a plurality of sets of two or more having the same value with the others having different values, etc.).

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

Aspects of the present invention, for example, are described below with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

In an aspect, the technology relates to a method, including receiving, by a computing system and from a user device, a request for real-time access to remote media production editing functionalities over at least one first network; selecting, by the computing system, at least one network edge node among a plurality of network edge nodes; and deploying and configuring, by the computing system, one or more compute resources on each of the selected at least one network edge node. The method also includes instantiating, by the computing system and on the one or more compute resources deployed on each of the selected at least one network edge node, a media production software application ("app") that is capable of performing media production editing functionalities consistent with the request; and provisioning, by the computing system, real-time access to the instantiated media production app via network connection between the user device and the selected at least one network edge node. The method further includes performing at least one of relaying, by the computing system and over the at least one first network, user input corresponding to user interface ("UI") options of the instantiated media production app from the user device to the media production app; or relaying, by the computing system and over the at least one first network, one or more of data, content, or editing results from the media production app to the user device; and/or the like.

In examples, the computing system includes at least one of a media production user experience ("UX") platform system, an edge orchestrator, a server, a cloud computing system, or a distributed computing system, and/or the like. In some instances, the one or more of the data, the content, or the editing results include at least one of media production file content, media production editing results, media production messages, images of media production file content, or images of media production editing results, and/or the like. In some cases, selecting the at least one network edge node among the plurality of network edge nodes is based at least in part on latency characteristics and other network characteristics of one or more network connections with the user device over the at least one first network.

In some examples, the network connection includes a remote workstation connection. In such examples, the method further includes establishing the remote workstation connection between the user device and the selected at least one network edge node, over the at least one first network.

In examples, the method further includes at least one of relaying, by the computing system and over the at least one first network, one or more media production files from or to a media storage system to or from the instantiated media production app; or relaying, by the computing system and over the at least one first network, images of one or more media production files from or to the media storage system to or from the instantiated media production app; and/or the like. In some examples, the one or more media production files or corresponding media production file content each includes one of an animated image file or animated image file content, a video file or video file content, a streaming file or streaming content, a game file or gaming graphic content, a virtual reality ("VR") file or VR content, an augmented reality ("AR") file or AR content, or a mixed reality ("MR") file or MR content, wherein the gaming graphic content includes at least one of cut-scene graphic content, in-game object graphic content, or animated game graphic content, and/or the like.

In some embodiments, the method further includes establishing, by the computing system, a real-time access connection between the selected at least one network edge node and a remote media storage system, via remote direct memory access ("RDMA") functionality; and providing, by the computing system, real-time access to at least one media production file that is stored on the remote media storage system via the established real-time access connection, for editing using the instantiated media production app. In examples, the remote media storage system includes one of an on-premises data storage system that is located at a customer premises, a data storage system disposed on one or more edge nodes among the plurality of network edge nodes, or a cloud-based media storage system, and/or the like.

According to some embodiments, relaying the at least one of the user input or the one or more of data, content, or editing results includes relaying, by the computing system, media production file images as packets using user datagram protocol ("UDP") from the media production app to the user device. In some instances, the media production file images include at least one of images of one or more media production files, images of corresponding media production file content, or images of results of media production editing, and/or the like; and rendering, by the computing system, the media production file images for display on the user device.

In some embodiments, the first user device is proximate to an access network. In examples, the at least one network edge node is geographically proximate to the access network relative to a cloud network, while a source location for the media production app and a remote data storage system on which media content for editing by the media production app is stored are located in the cloud network.

In some examples, the request includes at least one of a request for a particular media production app, a request for one or more media production apps that are compatible with a particular media format, or a request for one or more media production apps that are compatible with a media production file. The method further includes determining, by the computing system, whether at least one media production app has been deployed as a software as a service ("SaaS") instance on the one or more compute resources on at least one network edge node. The method further includes performing one of the following: (A) based on a determination that at least one first media production app has been instantiated on the one or more compute resources, determining, by the computing system, whether the at least one first media production app includes media production functionalities capable of performing media production editing functions consistent with the request; or (B) based on a determination that no media production app has not been instantiated on the one or more compute resources, instantiating at least one second media production app on the one or more compute resources, and determining, by the computing system, whether the at least one second media production app includes media production functionalities capable of performing media production editing functions consistent with the request. In examples, provisioning the real-time access to the instantiated media production app via network connection between the user device and the selected at least one network edge node is based on a determination that the at least one first media production app or the at least one second media production app includes media production functionalities capable of performing media production editing functions consistent with the request.

In another aspect, the technology relates to a system, including a plurality of network edge nodes. In examples, one or more network edge nodes among the plurality of network edge nodes each includes a bare metal machine including one or more compute resources and an operating system ("OS"). The system further includes a computing system is configured to receive, from a user device, a request for real-time access to remote media production editing functionalities over at least one first network; select at least one network edge node among the plurality of network edge nodes; and deploy and configure one or more virtual machines ("VMs") on each bare metal machine on each of the selected at least one network edge node, the one or more VMs interfacing with the corresponding one or more compute resources. The computing system is further configured to instantiate, on the one or more VMs deployed on each of the selected at least one network edge node, a media production software application ("app") that is capable of performing media production editing functionalities consistent with the request; and provision real-time access to the instantiated media production app via network connection between the user device and the selected at least one network edge node. The computing system is further configured to perform at least one of relaying, over the at least one first network, user input corresponding to user interface ("UI") options of the instantiated media production app from the user device to the media production app; or relaying, over the at least one first network, one or more of data, content, or editing results from the media production app to the user device.

In some embodiments, the computing system includes at least one of a media production user experience ("UX") platform system, an edge orchestrator, a server, a cloud computing system, or a distributed computing system, and/ or the like. In some instances, the one or more of the data, the content, or the editing results include at least one of media production file content, media production editing results, media production messages, images of media production file content, or images of media production editing results, and/or the like. In some cases, selecting the at least one network edge node among the plurality of network edge nodes is based at least in part on latency characteristics and other network characteristics of one or more network connections with the user device over the at least one first network.

According to some embodiments, the computing system is further configured to relay, over the at least one first network, one or more media production files from or to a media storage system to or from the instantiated media production app; or relay, over the at least one first network, images of one or more media production files from or to the media storage system to or from the instantiated media production app.

In examples, the computing system is further configured to establish a real-time access connection between the selected at least one network edge node and a remote media storage system, via remote direct memory access ("RDMA") functionality; and provide real-time access to at least one media production file that is stored on the remote media storage system via the established real-time access connection, for editing using the instantiated media production app.

In some examples, relaying the at least one of the user input or the one or more of data, content, or editing results includes relaying media production file images as packets using user datagram protocol ("UDP") from the media production app to the user device; and rendering the media production file images for display on the user device. In examples, the media production file images include at least one of images of one or more media production files, images of corresponding media production file content, or images of results of media production editing, and/or the like.

In yet another aspect, the technology relates to a method, including receiving, by a computing system and from a user device, a request for real-time access to remote media production editing functionalities over at least one first network; provisioning, by the computing system, real-time access to a media production software application ("app") on at least one of one or more compute resources or one or more virtual machines ("VMs") that are hosted on at least one network edge node among a plurality of network edge nodes; and establishing, by the computing system, a real-time access connection between the at least one network edge node and a remote media storage system, via remote direct memory access ("RDMA") functionality. The method further includes providing, by the computing system, real-time access to at least one media production file that is stored on the remote media storage system via the established real-time access connection, for editing using the instantiated media production app; and performing at least one of: relaying, by the computing system and over the at least one first network, user input corresponding to user interface ("UI") options of the instantiated media production app from the user device to the media production app; or relaying, by the computing system and over the at least one first network, one or more of data, content, or editing results from the media production app to the user device; and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

Specific Exemplary Embodiments

We now turn to the embodiments as illustrated by the drawings. FIGS. 1-5 illustrate some of the features of the method, system, and apparatus for implementing edge network service provisioning, particularly, to methods, systems, and apparatuses for implementing real-time access to remote media production editing functionality, and, more particularly, to methods, systems, and apparatuses for implementing real-time access to remote video editing functionality, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

With reference to the figures, FIG. 1 depicts an example system 100 for implementing real-time access to remote media production editing functionality and/or remote video editing functionality, in accordance with various embodiments.

In the non-limiting embodiment of FIG. 1, example system 100 includes an orchestrator 105 in network(s) 110 that is associated with a service provider(s). System 100 further includes a plurality of edge nodes or network edge nodes 115a-115n (collectively, "edge nodes 115," "network edge nodes 115," or the like) in edge network(s) 120 that is located at location(s) 125. In examples, at least one edge node 115 among the plurality of edge nodes 115a-115n each includes one or more bare metal machines 130a-130m (collectively, "bare metal machines 130" or the like). In some examples, the one or more bare metal machines 130a-130m may host corresponding one or more operating systems ("OSs") 135a-135m (collectively, "operating systems 135" or the like), one or more compute resources 140a-140m (including one or more graphics processing units ("GPUs") 145a, one or more field programmable gate arrays ("FPGAs") 145m, one or more central processing units ("CPUs"), one or more other compute resources, and/or the like), one or more storage resources 150 (including one or more databases, one or more network file systems ("NFSs"), and the like), or the like. System 100 further includes user device 155 disposed at customer premises 160, accessible via access network(s) 165.

Orchestrator 105 may access one or more cloud service providers 1—X 175a-175x (collectively, "cloud service providers 175" or the like). The one or more cloud service providers 175a-175x may include corresponding one or more cloud compute resources 180a-180x (collectively, "cloud compute resources 180" or the like) and corresponding one or more cloud storage resources 185a-185x (collectively, "cloud storage resources 185" or the like). In some examples, one or more media production software applications ("apps") 190 and/or one or more media files 195 may be stored on at least one of the cloud storage resources 185a-185x. Herein, m, n, and x or X are non-negative integer numbers that may be either all the same as each other, all different from each other, or some combination of same and different (e.g., one set of two or more having the same values with the others having different values, a plurality of sets of two or more having the same value with the others having different values, etc.).

According to some embodiments, network(s) 110, 120, and/or 165 may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 110, 120, and/or 165 may include an access network of the service provider (e.g., an Internet service provider ("ISP")). In another embodiment, the network(s) 110, 120, and/or 165 may include a core network of the service provider and/or the Internet.

In some instances, the user device(s) 155 may each include, but is not limited to, one of a desktop computer, a laptop computer, a tablet computer, a smart phone, a mobile phone, a media production editor, or any suitable media production editing device that is capable of communicating with edge network(s) 120, via a web-based portal, an application programming interface ("API"), a server, a software application ("app"), or any other suitable communications interface, or the like (not shown), over access network(s) 165. In some cases, customer premises 160 may include, but is not limited to, one of a residential customer premises, a business customer premises, a corporate customer premises, an enterprise customer premises, an education facility customer premises, a medical facility customer premises, or a governmental customer premises, and/or the like.

In some examples, the one or more media production files or corresponding media production file content 195 or 195a each includes one of an animated image file or animated image file content, a video file or video file content, a streaming file or streaming content, a game file or gaming graphic content, a virtual reality ("VR") file or VR content, an augmented reality ("AR") file or AR content, or a mixed reality ("MR") file or MR content, and/or the like. In examples, the gaming graphic content includes at least one of cut-scene graphic content, in-game object graphic content, or animated game graphic content, and/or the like. In examples, the one or more media production applications 190 or 190a may include at least one of one or more animated image editors, one or more video file editors, one or more streaming file editors, one or more game engines, one or more game content editors, one or more VF/AR/MR content editors, and/or the like.

In some embodiments, the user device 155 is proximate to access network(s) 165. In examples, the at least one network edge node 115 is geographically proximate to the access network(s) 165 relative to a cloud network(s) over which the one or more cloud service providers 175a-175x provide cloud services, while a source location for the media production app(s) (e.g., media production apps 190) and a remote data storage system on which media content (e.g., media files 195) for editing by the media production app is stored are located in the cloud network. In some examples, a real-time access connection may be established between the at least one network edge node 115 and a remote media storage system (e.g., one or more of cloud storage resources 185a-185x), via remote direct memory access ("RDMA")

functionality 170 that provides real-time access to apps (e.g., media production app 190a) and/or data or files (e.g., media file(s) 195a) stored in the remote media storage system (e.g., one or more of cloud storage systems 185a-185x, or the like) without involving an OS of the remote media storage system (e.g., as depicted in FIG. 1, by long dashed lines between orchestrator 105 and each of edge nodes 115a-115n and each of cloud service providers 175a-175x, and by RDMA pipe 170 and double-dash-dot line between remote data access app 170a at FPGA 145m and remote data access app 170b at compute resource 180a). For RDMA functionality, apps (e.g., third-party RDMA apps or remote data access apps 170a and 170b) installed at each end point (e.g., at compute resources 140/145 of edge node 115 and at each of one or more cloud compute resources 180a-180x) provides real-time access via RDMA. User device 155 may display rendered images of files and data (e.g., media production app 190a and media files 195a) that are executed and processed at compute resources 140 of an edge node(s) 115 (e.g., as depicted in FIG. 1, by dotted line between edge node 115a and user device 155 via access network(s) 165).

In operation, orchestrator 105 and/or edge nodes 115a-115n (collectively, "computing system") may perform methods for implementing real-time access to remote media production editing functionality and/or remote video editing functionality, as described in detail with respect to FIGS. 2-5. For example, an example UI(s) 200 is shown with respect to FIG. 2, example methods 300, 400, and 500 are shown with respect to FIGS. 3A-3D, 4A-4D, and 5, respectively, may be applied with respect to the operations of system 100 of FIG. 1. In examples, apps running on the edge node(s) 115a-115n and the cloud service provider 175a-175x (e.g., media apps and RDMA app(s), etc.) perform the methods for implementing real-time access to remote media production editing functionality and/or remote video editing functionality, rather than using the orchestrator 105.

Figure 2:
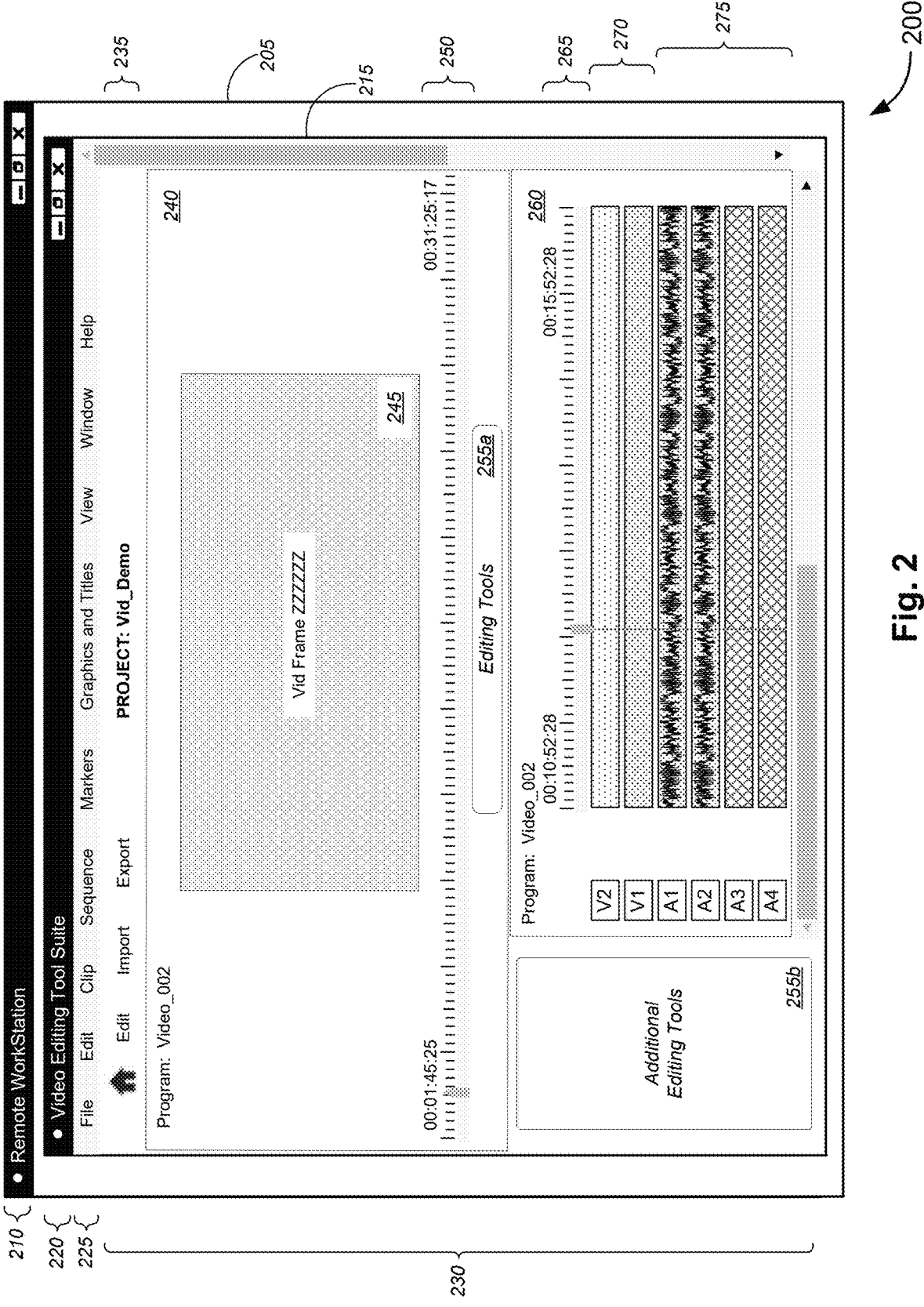
FIG. 2 depicts an example user interface(s) ("UI(s)") that may be used for implementing real-time access to remote media production editing functionality and/or remote video editing functionality, in accordance with various embodiments.

FIG. 2 depicts an example user interface ("UI") 200 that may be used for implementing real-time access to remote media production editing functionality and/or remote video editing functionality, in accordance with various embodiments.

With reference to the non-limiting example FIG. 2, example UI 200 includes a remote workstation UI 205 (e.g., app window 205, or the like) having a header portion 210 (e.g., indicating the UI or app window 205 as "Remote WorkStation" or the like). The remote workstation UI 205 may be executed on an edge node (e.g., edge node 115 of FIG. 1, or the like) while being rendered and displayed on a remote client (e.g., user device 155 of FIG. 1, or the like). Through the remote workstation UI 205, a media production app (e.g., media production app 190a of FIG. 1, or the like) may be executed or instantiated on compute resources (e.g., compute resources 140 and/or GPU 145 of FIG. 1, or the like), and its UI 215 (in this case, video editing app or app window 215, or the like) may be displayed on the remote workstation UI 205. The UI 215 has a header portion 220 (e.g., indicating the UI or app window 215 as "Video Editing Tool Suite" or the like), a secondary header portion 225 (including a menu bar displaying menu categories, including at least one of "File," "Edit," "Clip," "Sequence," "Markers," "Graphics and Titles," "View," "Window," or "Help" or the like). App Project Display 230 may be displayed within the UI 215. UI 215 has a project display header portion 235 (including at least one of home icon, sub-menu categories including at least one of "Edit," "Import," or "Export," or the like, and title portion (e.g., indicating the project as "PROJECT: Vid_Demo" or the like).

In examples, displayed within the App Project Display 230 may be app panels including a video display portion 240 and a video editing portion 260. In examples, the video display portion 240 and/or the video editing portion 260 may include a display portion 245, a display time scale 250, editing tools 255a and/or 255b, editing time scale 265, video streams 270, and audio streams 275. The display portion 245 is configured for displaying a video or other media production file or frames of the video or other media production file. The display time scale 250 includes markers for tracking display frames of the video or other media production file, while the editing time scale 265 includes moving markers for tracking editing frames of the video or other media production file. The editing tools 255a and/or 255b may include at least one of playback, pause, forward, reverse, frame advance, frame reverse, frame hold, field options, time interpolation, scale to frame size, set to frame size, adjustment layer, edit original, edit clip in [another app], replace with after effects composition, replace with clip, render and replace, restore unrendered, restore captions from source clip, enable clip, unlink clip, group clips, ungroup clips, synchronize clips, merge clips, nest clips, make subsequence, multi-camera options, label, speed/duration options, scene edit detection, audio gain options, audio channel options, and/or the like. In some examples, the video streams 270 may include an original video stream and an adjustment video stream, while the audio streams 275 may include one or more audio streams.

In an aspect, with respect to FIGS. 1 and 2, the orchestrator 105 and edge nodes 115a-115n enable real-time processing capabilities and ultra-low latency for live streaming events and post-production editing. By processing video or other media production feeds closer to the source (e.g., processing the video or other media production feeds at the compute resources 140 and/or GPU(s) 145 at least one edge node 115 closer to the storage resources 150 (which accesses the media file(s) 195a via RDMA)), the platform (including the orchestrator 105, edge nodes 115a-115n, and other network components of network(s) 110 and 120, etc.) ensures a smoother viewer experience and faster content delivery. In examples, software-defined ("SD") networking may enable real-time data access across edge nodes 115a-115n and public cloud service providers 175a-175x allows for data processing without the need for moves or transfers (e.g., via RDMA). By keeping sensitive content close to the source, edge computing enhances data security and privacy. In some examples, the orchestrator 105 and the platform allows for distributed processing, enabling real-time collaboration among media production team members by minimizing latency and enhancing synchronization across devices. In examples, the platform may enable integrated security, by which processing high-resolution content can be offloaded to edge-based compute (e.g., compute resources 140) with tiered storage and access to GPUs (e.g., GPUs 145), reducing the need for high bandwidth and improving the overall editing experience by reducing or minimizing lag and buffering. In some examples, the platform may be a scalable platform that enables offloading of processing tasks to multiple devices in a distributed network. This helps optimize resource usage, ensuring that processing power is allocated efficiently and allowing media production projects to scale smoothly.

In some aspects, the platform may involve industry leading interconnectivity, which may include public and private cloud, global capacity, market leading peering, and ultra-low latency. The platform may also involve content services including encoding and enrichment, object storage, delivery and optimization, and security and acceleration. The platform may also involve hybrid edge cloud including cloud service provider(s), edge bare metal, edge storage, and integrated network managed services. The platform may further involve remote data access including secure, real-time data access, and on-premises data storage, edge node data storage, and/or public/private cloud storage.

FIGS. 3A-3D (collectively, "FIG. 3") depict flow diagrams illustrating an example method 300 for implementing real-time access to remote media production editing functionality and/or remote video editing functionality, in accordance with various embodiments. Method 300 of FIG. 3A continues onto at least one of FIG. 3B following the circular marker denoted, "A," FIG. 3C following the circular marker denoted, "B," or continues onto FIG. 3D following the circular marker denoted, "C."

In the non-limiting embodiment of FIG. 3A, method 300, at operation 305, may include receiving, by a computing system and from a user device, a request for real-time access to remote media production editing functionalities over at least one first network. At operation 310, method 300 further includes selecting, by the computing system, at least one network edge node among a plurality of network edge nodes. Method 300 further includes, at operation 315, deploying and configuring, by the computing system, one or more compute resources on each of the selected at least one network edge node. Method 300 further includes instantiating, by the computing system and on the one or more compute resources deployed on each of the selected at least one network edge node, a media production software application ("app") that is capable of performing media production editing functionalities consistent with the request (at operation 320).

In examples, the computing system includes at least one of a media production user experience ("UX") platform system, an edge orchestrator, a server, a cloud computing system, or a distributed computing system, and/or the like. In some instances, the one or more of the data, the content, or the editing results include at least one of media production file content, media production editing results, media production messages, images of media production file content, or images of media production editing results, and/or the like. In some cases, selecting the at least one network edge node among the plurality of network edge nodes (at operation 310) is based at least in part on latency characteristics and other network characteristics of one or more network connections with the user device over the at least one first network.

At operation 325, method 300 further includes provisioning, by the computing system, real-time access to the instantiated media production app via network connection between the user device and the selected at least one network edge node. Method 300, at operation 330, includes relaying user inputs and data, including performing at least one of the following. In an example, relaying user inputs and data (at operation 330) includes relaying, by the computing system and over the at least one first network, user input corresponding to user interface ("UI") options of the instantiated media production app from the user device to the media production app (at operation 335). In another example, relaying user inputs and data (at operation 330) includes relaying, by the computing system and over the at least one first network, one or more of data, content, or editing results from the media production app to the user device (at operation 340). In yet another example, relaying user inputs and data (at operation 330) includes relaying, by the computing system and over the at least one first network, one or more media production files from or to a media storage system to or from the instantiated media production app (at operation 345). In still another example, relaying user inputs and data (at operation 330) includes relaying, by the computing system and over the at least one first network, images of one or more media production files from or to the media storage system to or from the instantiated media production app (at operation 350).

Method 300 may continue onto at least one of the process at operation 355 in FIG. 3B following the circular marker denoted, "A," the process at operation 360 in FIG. 3C following the circular marker denoted, "B," or the process at operation 370 in FIG. 3D following the circular marker denoted, "C."

In some examples, the network connection includes a remote workstation connection. At operation 355 in FIG. 3B (following the circular marker denoted, "A"), method 300 may include establishing the remote workstation connection between the user device and the selected at least one network edge node, over the at least one first network.

At operation 360 in FIG. 3C (following the circular marker denoted, "B"), method 300 may include establishing, by the computing system, a real-time access connection between the selected at least one network edge node and a remote media storage system, via RDMA functionality that provides real-time access to data or files stored in the remote media storage system without involving an OS of the remote media storage system. Method 300, at operation 365, may include providing, by the computing system, real-time access to at least one media production file that is stored on the remote media storage system via the established real-time access connection, for editing using the instantiated media production app. In examples, the remote media storage system includes one of an on-premises data storage system that is located at a customer premises, a data storage system disposed on one or more edge nodes among the plurality of network edge nodes, or a cloud-based media storage system, and/or the like.

At operation 370 in FIG. 3D (following the circular marker denoted, "C"), method 300 may include relaying, by the computing system, media production file images as packets using UDP from the media production app to the user device. Method 300, at operation 375, includes rendering, by the computing system, the media production file images for display on the user device. In some instances, the media production file images include at least one of images of one or more media production files, images of corresponding media production file content, or images of results of media production editing, and/or the like; and rendering, by the computing system, the media production file images for display on the user device.

FIGS. 4A-4D (collectively, "FIG. 4") depict flow diagrams illustrating another example method 400 for implementing real-time access to remote media production editing functionality and/or remote video editing functionality, in accordance with various embodiments. Method 400 of FIG. 4A continues onto at least one of FIG. 4B following the circular marker denoted, "A," FIG. 4C following the circular marker denoted, "B," or continues onto FIG. 4D following the circular marker denoted, "C."

Figure 4A:
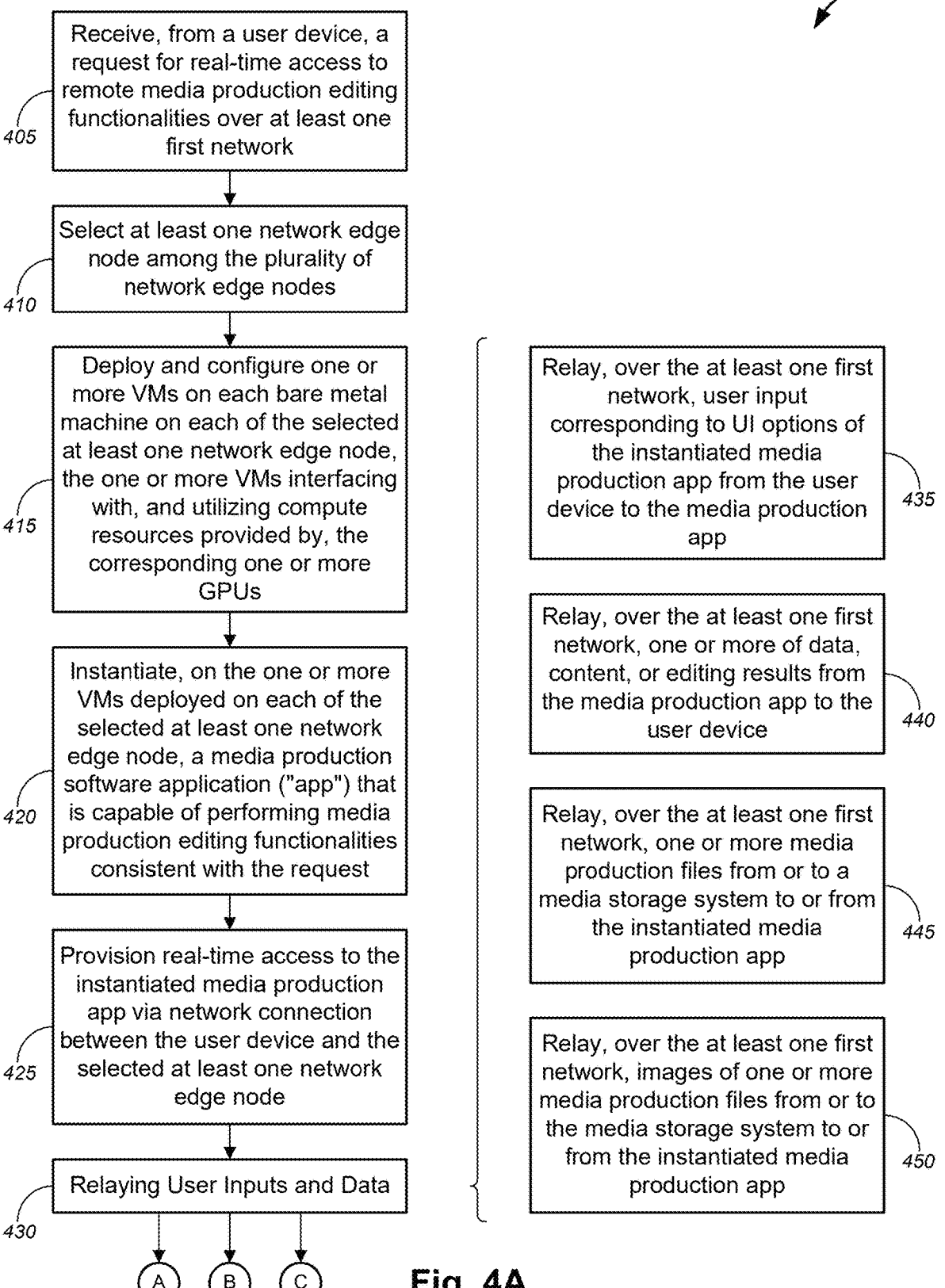

In the non-limiting embodiment of FIG. 4A, method 400, at operation 405, may include receiving, from a user device, a request for real-time access to remote media production editing functionalities over at least one first network. At operation 410, method 400 further includes selecting at least one network edge node among the plurality of network edge nodes. Method 400 further includes, at operation 415, deploying and configuring one or more virtual machines ("VMs") on each bare metal machine on each of the selected at least one network edge node, the one or more VMs interfacing with, and utilizing compute resources provided by, the corresponding one or more GPUs and/or other compute resources (e.g., FPGAs, CPUs, etc.). Method 400 further includes instantiating, on the one or more VMs deployed on each of the selected at least one network edge node, a media production software application ("app") that is capable of performing media production editing functionalities consistent with the request (at operation 420). At operation 425, method 400 further includes provisioning real-time access to the instantiated media production app via network connection between the user device and the selected at least one network edge node. Method 400, at operation 430, includes relaying user inputs and data, including performing at least one of the following. In an example, relaying user inputs and data (at operation 430) includes relaying, by the computing system and over the at least one first network, user input corresponding to UI options of the instantiated media production app from the user device to the media production app (at operation 435). In another example, relaying user inputs and data (at operation 430) includes relaying, by the computing system and over the at least one first network, one or more of data, content, or editing results from the media production app to the user device (at operation 440). In yet another example, relaying user inputs and data (at operation 430) includes relaying, by the computing system and over the at least one first network, one or more media production files from or to a media storage system to or from the instantiated media production app (at operation 445). In still another example, relaying user inputs and data (at operation 430) includes relaying, by the computing system and over the at least one first network, images of one or more media production files from or to the media storage system to or from the instantiated media production app (at operation 450).

Method 400 may continue onto at least one of the process at operation 455 in FIG. 4B following the circular marker denoted, "A," the process at operation 460 in FIG. 4C following the circular marker denoted, "B," or the process at operation 470 in FIG. 4D following the circular marker denoted, "C."

In some examples, the network connection includes a remote workstation connection. At operation 455 in FIG. 4B (following the circular marker denoted, "A"), method 400 may include establishing the remote workstation connection between the user device and the selected at least one network edge node, over the at least one first network.

At operation 460 in FIG. 4C (following the circular marker denoted, "B"), method 400 may include establishing, by the computing system, a real-time access connection between the selected at least one network edge node and a remote media storage system, via RDMA functionality that provides real-time access to data or files stored in the remote media storage system without involving an OS of the remote media storage system. Method 400, at operation 465, may include providing, by the computing system, real-time access to at least one media production file that is stored on the remote media storage system via the established real-time access connection, for editing using the instantiated media production app. In examples, the remote media storage system includes one of an on-premises data storage system that is located at a customer premises, a data storage system disposed on one or more edge nodes among the plurality of network edge nodes, or a cloud-based media storage system, and/or the like.

At operation 470 in FIG. 4D (following the circular marker denoted, "C"), method 400 may include relaying, by the computing system, media production file images as packets using UDP from the media production app to the user device. Method 400, at operation 475, includes rendering, by the computing system, the media production file images for display on the user device. In some instances, the media production file images include at least one of images of one or more media production files, images of corresponding media production file content, or images of results of media production editing, and/or the like; and rendering, by the computing system, the media production file images for display on the user device.

Method 400 may otherwise be similar, if not identical, to method 300.

FIG. 5 depicts flow diagrams illustrating yet another example method 500 for implementing real-time access to remote media production editing functionality and/or remote video editing functionality, in accordance with various embodiments.

In the non-limiting embodiment of FIG. 5, method 500, at operation 505, may include receiving, by a computing system and from a user device, a request for real-time access to remote media production editing functionalities over at least one first network. At operation 510, method 500 may include provisioning, by the computing system, real-time access to a media production app on at least one of one or more compute resources or one or more VMs that are hosted on at least one network edge node among a plurality of network edge nodes. Method 500 further includes, at operation 515, establishing, by the computing system, a real-time access connection between the at least one network edge node and a remote media storage system, via RDMA functionality. Method 500 further includes providing, by the computing system, real-time access to at least one media production file that is stored on the remote media storage system via the established real-time access connection, for editing using the instantiated media production app (at operation 520).

At operation 525, method 500 further includes relaying user inputs and data, including performing at least one of the following. In an example, relaying user inputs and data (at operation 525) includes relaying, by the computing system and over the at least one first network, user input corresponding to UI options of the instantiated media production app from the user device to the media production app (at operation 530). In another example, relaying user inputs and data (at operation 525) includes relaying, by the computing system and over the at least one first network, one or more of data, content, or editing results from the media production app to the user device; and/or the like (at operation 535). In yet another example, relaying user inputs and data (at operation 525) includes relaying, by the computing system and over the at least one first network, one or more media production files from or to a media storage system to or from the instantiated media production app (at operation 540). In still another example, relaying user inputs and data (at operation 525) includes relaying, by the computing system and over the at least one first network, images of one or more media production files from or to the media storage system to or from the instantiated media production app; and/or the like (at operation 545).

Method 500 may otherwise be similar, if not identical, to method 300 or 400.

While the techniques and procedures in methods 300, 400, and 500 are depicted and/or described in a certain order for purposes of illustration, it should be appreciated that certain procedures may be reordered and/or omitted within the scope of various embodiments. Moreover, while the methods 200, 300, and 400 may be implemented by or with (and, in some cases, are described below with respect to) the system(s), example(s), or embodiment(s) 100 and 200 of FIGS. 1 and 2 (or components thereof), such methods may also be implemented using any suitable hardware (or software) implementation. Similarly, while each of the system(s), example(s), or embodiment(s) 100 and 200 of FIGS. 1 and 2 (or components thereof), can operate according to the methods 200, 300, and 400 may be implemented by or with (and, in some cases, are described below with respect to) the system(s), example(s), or embodiment(s) 100 and 200 of FIGS. 1 and 2 can each also operate according to other modes of operation and/or perform other suitable procedures.

Exemplary System and Hardware Implementation

Figure 6:
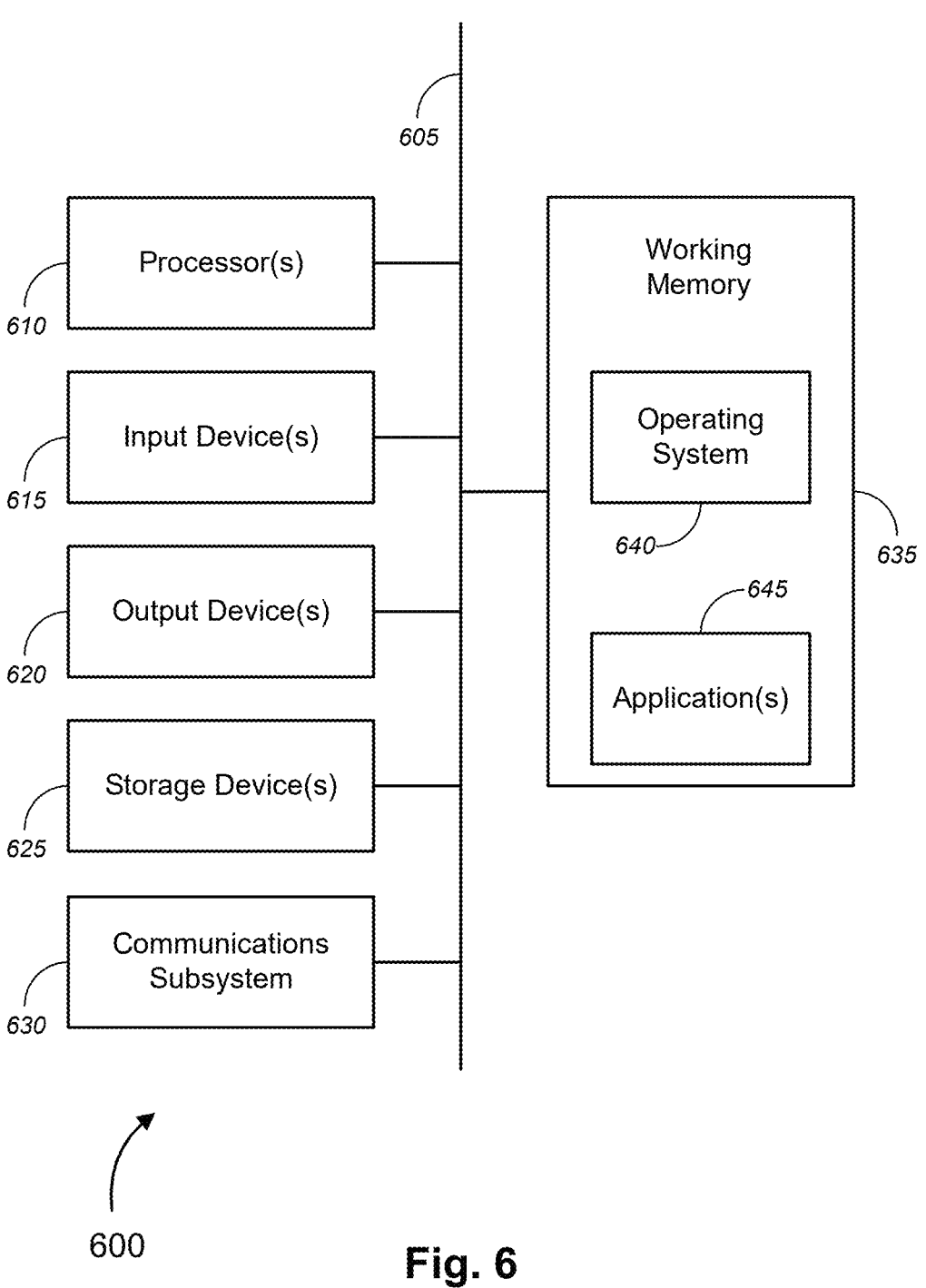
FIG. 6 depicts a block diagram illustrating an exemplary computer or system hardware architecture, in accordance with various embodiments.

FIG. 6 is a block diagram illustrating an exemplary computer or system hardware architecture, in accordance with various embodiments. FIG. 6 provides a schematic illustration of one embodiment of a computer system 600 of the service provider system hardware that can perform the methods provided by various other embodiments, as described herein, and/or can perform the functions of computer or hardware system (i.e., orchestrator 105, edge nodes or network edge nodes 115*a*-115*n,* user device 155, etc.), as described above. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer or hardware system 600—which might represent an embodiment of the computer or hardware system (i.e., orchestrator 105, edge nodes or network edge nodes 115*a*-115*n,* user device 155, etc.), described above with respect to FIGS. 1-5—is shown including hardware elements that can be electrically coupled via a bus 605 (or may otherwise be in communication, as appropriate). The hardware elements may include one or more processors 610, including, without limitation, one or more general-purpose processors and/or one or more special-purpose processors (such as microprocessors, digital signal processing chips, graphics acceleration processors, and/or the like); one or more input devices 615, which can include, without limitation, a mouse, a keyboard, and/or the like; and one or more output devices 620, which can include, without limitation, a display device, a printer, and/or the like.

The computer or hardware system 600 may further include (and/or be in communication with) one or more storage devices 625, which can include, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 600 might also include a communications subsystem 630, which can include, without limitation, a modem, a network card (wireless or wired), an infra-red communication device, a wireless communication device and/or chipset (such as a Bluetooth™ device, an 802.11 device, a Wi-Fi device, a WiMAX device, a wireless wide area network ("WWAN") device, cellular communication facilities, etc.), and/or the like. The communications subsystem 630 may permit data to be exchanged with a network (such as the network described below, to name one example), with other computer or hardware systems, and/or with any other devices described herein. In many embodiments, the computer or hardware system 600 will further include a working memory 635, which can include a RAM or ROM device, as described above.

The computer or hardware system 600 also may include software elements, shown as being currently located within the working memory 635, including an operating system 640, device drivers, executable libraries, and/or other code, such as one or more application programs 645, which may include computer programs provided by various embodiments (including, without limitation, hypervisors, virtual machines ("VMs"), and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 600 and/or might take the form of source and/or installable code, which, upon compilation and/or installation on the computer or hardware system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 600) to perform methods in accordance with various embodiments of the invention. According to a set of embodiments, some or all of the procedures of such methods are performed by the computer or hardware system 600 in response to processor 610 executing one or more sequences of one or more instructions (which might be incorporated into the operating system 640 and/or other code, such as an application program 645)

contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire, and fiber optics, including the wires that include the bus 605, as well as the various components of the communication subsystem 630 (and/or the media by which the communications subsystem 630 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:

receiving, by a computing system and from a user device, a request for real-time access to remote media production editing functionalities over at least one first network;

selecting, by the computing system, at least one network edge node among a plurality of network edge nodes;

deploying and configuring, by the computing system, one or more compute resources on each of the selected at least one network edge node;

instantiating, by the computing system and on the one or more compute resources deployed on each of the selected at least one network edge node, a media production software application ("app") that is capable of performing media production editing functionalities consistent with the request, wherein the request comprises at least one of a request for a particular media production app, a request for one or more media production apps that are compatible with a particular media format, or a request for one or more media production apps that are compatible with a media production file;

provisioning, by the computing system, real-time access to the instantiated media production app via network connection between the user device and the selected at least one network edge node;

performing at least one of:

relaying, by the computing system and over the at least one first network, user input corresponding to user interface ("UI") options of the instantiated media production app from the user device to the media production app; or relaying, by the computing system and over the at least one first network, one or more of data, content, or editing results from the media production app to the user device;

determining, by the computing system, whether at least one media production app has been deployed as a software as a service ("SaaS") instance on the one or more compute resources on at least one network edge node, performing one of the following:

based on a determination that at least one first media production app has been instantiated on the one or more compute resources, determining, by the computing system, whether the at least one first media production app includes media production functionalities capable of performing media production editing functions consistent with the request; or based on a determination that no media production app has not been instantiated on the one or more compute resources, instantiating at least one second media production app on the one or more compute resources, and determining, by the computing system, whether the at least one second media production app includes media production functionalities capable of performing media production editing functions consistent with the request, wherein provisioning the real-time access to the instantiated media production app via network connection between the user device and the selected at least one network edge node is based on a determination that the at least one first media production app or the at least one second media production app includes media production functionalities capable of performing media production editing functions consistent with the request.

2. The method of claim 1, wherein the computing system comprises at least one of a media production user experience ("UX") platform system, an edge orchestrator, a server, a cloud computing system, or a distributed computing system.

3. The method of claim 1, wherein the one or more of the data, the content, or the editing results comprise at least one of media production file content, media production editing results, media production messages, images of media production file content, or images of media production editing results.

4. The method of claim 1, wherein selecting the at least one network edge node among the plurality of network edge nodes is based at least in part on latency characteristics and other network characteristics of one or more network connections with the user device over the at least one first network.

5. The method of claim 1, wherein the network connection comprises a remote workstation connection, wherein the method further comprises:

establishing the remote workstation connection between the user device and the selected at least one network edge node, over the at least one first network.

6. The method of claim 1, further comprising at least one of:

relaying, by the computing system and over the at least one first network, one or more media production files from or to a media storage system to or from the instantiated media production app; or relaying, by the computing system and over the at least one first network, images of one or more media production files from or to the media storage system to or from the instantiated media production app.

7. The method of claim 6, wherein the one or more media production files or corresponding media production file content each comprises one of an animated image file or animated image file content, a video file or video file content, a streaming file or streaming content, a game file or gaming graphic content, a virtual reality ("VR") file or VR content, an augmented reality ("AR") file or AR content, or a mixed reality ("MR") file or MR content, wherein the gaming graphic content comprises at least one of cut-scene graphic content, in-game object graphic content, or animated game graphic content.

8. The method of claim 1, further comprising:
establishing, by the computing system, a real-time access connection between the selected at least one network edge node and a remote media storage system, via remote direct memory access ("RDMA") functionality; and
providing, by the computing system, real-time access to at least one media production file that is stored on the remote media storage system via the established real-time access connection, for editing using the instantiated media production app.

9. The method of claim 8, wherein the remote media storage system comprises one of an on-premises data storage system that is located at a customer premises, a data storage system disposed on one or more edge nodes among the plurality of network edge nodes, or a cloud-based media storage system.

10. The method of claim 1, wherein relaying the at least one of the user input or the one or more of data, content, or editing results comprises:
relaying, by the computing system, media production file images as packets using user datagram protocol ("UDP") from the media production app to the user device, wherein the media production file images comprise at least one of images of one or more media production files, images of corresponding media production file content, or images of results of media production editing; and
rendering, by the computing system, the media production file images for display on the user device.

11. The method of claim 1, wherein the first user device is proximate to an access network, wherein the at least one network edge node is geographically proximate to the access network relative to a cloud network, wherein a source location for the media production app and a remote data storage system, on which media content for editing by the media production app is stored, are located in the cloud network.

12. A system, comprising:
a plurality of network edge nodes, wherein one or more network edge nodes among the plurality of network edge nodes each comprises:
a bare metal machine comprising one or more compute resources and an operating system ("OS");
a computing system is configured to:
receive, from a user device, a request for real-time access to remote media production editing functionalities over at least one first network;
select at least one network edge node among the plurality of network edge nodes;
deploy and configure one or more virtual machines ("VMs") on each bare metal machine on each of the selected at least one network edge node, the one or more VMs interfacing with the corresponding one or more compute resources;
instantiate, on the one or more VMs deployed on each of the selected at least one network edge node, a media production software application ("app") that is capable of performing media production editing functionalities consistent with the request, wherein the request comprises at least one of a request for a particular media production app, a request for one or more media production apps that are compatible with a particular media format, or a request for one or more media production apps that are compatible with a media production file;
provision real-time access to the instantiated media production app via network connection between the user device and the selected at least one network edge node;
perform at least one of:
relaying, over the at least one first network, user input corresponding to user interface ("UI") options of the instantiated media production app from the user device to the media production app; or
relaying, over the at least one first network, one or more of data, content, or editing results from the media production app to the user device
determine whether at least one media production app has been deployed as a software as a service ("SaaS") instance on the one or more compute resources on at least one network edge node,
perform one of the following:
based on a determination that at least one first media production app has been instantiated on the one or more compute resources, determine whether the at least one first media production app includes media production functionalities capable of performing media production editing functions consistent with the request; or
based on a determination that no media production app has not been instantiated on the one or more compute resources, instantiating at least one second media production app on the one or more compute resources; and
determine whether the at least one second media production app includes media production functionalities capable of performing media production editing functions consistent with the request,
wherein provisioning the real-time access to the instantiated media production app via network connection between the user device and the selected at least one network edge node is based on a determination that the at least one first media production app or the at least one second media production app includes media production functionalities capable of performing media production editing functions consistent with the request.

13. The system of claim 12, wherein the computing system comprises at least one of a media production user experience ("UX") platform system, an edge orchestrator, a server, a cloud computing system, or a distributed computing system.

14. The system of claim 12, wherein the one or more of the data, the content, or the editing results comprise at least one of media production file content, media production editing results, media production messages, images of media production file content, or images of media production editing results.

15. The system of claim 12, wherein selecting the at least one network edge node among the plurality of network edge nodes is based at least in part on latency characteristics and other network characteristics of one or more network connections with the user device over the at least one first network.

16. The system of claim 12, wherein the computing system is further configured to:

relay, over the at least one first network, one or more media production files from or to a media storage system to or from the instantiated media production app; or relay, over the at least one first network, images of one or more media production files from or to the media storage system to or from the instantiated media production app.

17. The system of claim 12, wherein the computing system is further configured to:

establish a real-time access connection between the selected at least one network edge node and a remote media storage system, via remote direct memory access ("RDMA") functionality; and provide real-time access to at least one media production file that is stored on the remote media storage system via the established real-time access connection, for editing using the instantiated media production app.

18. The system of claim 12, wherein relaying the at least one of the user input or the one or more of data, content, or editing results comprises:

relaying media production file images as packets using user datagram protocol ("UDP") from the media production app to the user device, wherein the media production file images comprise at least one of images of one or more media production files, images of corresponding media production file content, or images of results of media production editing; and rendering the media production file images for display on the user device.

\* \* \* \* \*